(12) United States Patent
Fukami

(10) Patent No.: US 11,190,583 B2
(45) Date of Patent: Nov. 30, 2021

(54) LOAD BALANCING DEVICE, COMMUNICATION SYSTEM, CONTROL METHOD, AND PROGRAM

(71) Applicant: NEC Corporation, Tokyo (JP)

(72) Inventor: Tomotaka Fukami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/355,926

(22) Filed: Mar. 18, 2019

(65) Prior Publication Data

US 2019/0297142 A1    Sep. 26, 2019

(30) Foreign Application Priority Data

Mar. 23, 2018   (JP) .............................. JP2018-056063

(51) Int. Cl.
*H04L 29/08* (2006.01)
*H04L 29/12* (2006.01)

(52) U.S. Cl.
CPC ...... *H04L 67/1036* (2013.01); *H04L 61/1511* (2013.01); *H04L 61/2007* (2013.01); *H04L 67/02* (2013.01); *H04L 67/1029* (2013.01)

(58) Field of Classification Search
None
See application file for complete search history.

(56) References Cited

U.S. PATENT DOCUMENTS

| | | | |
|---|---|---|---|
| 6,078,943 A | 6/2000 | Yu | |
| 6,351,775 B1* | 2/2002 | Yu | H04L 67/1008 709/238 |
| 2009/0157870 A1* | 6/2009 | Nakadai | H04L 41/12 709/224 |
| 2010/0008319 A1* | 1/2010 | Awano | H04L 47/10 370/329 |
| 2010/0250734 A1 | 9/2010 | Ajiro | |
| 2010/0257266 A1* | 10/2010 | Holmes | G06Q 30/00 709/224 |
| 2012/0102192 A1 | 4/2012 | Takeshima et al. | |
| 2013/0007253 A1* | 1/2013 | Li | H04L 45/64 709/223 |

(Continued)

FOREIGN PATENT DOCUMENTS

| | | |
|---|---|---|
| JP | H07-225746 A | 8/1995 |
| JP | H10-254838 A | 9/1998 |

(Continued)

OTHER PUBLICATIONS

Japanese Office Action for JP Application No. 2018-056063 dated Dec. 4, 2018 with English Translation.

(Continued)

*Primary Examiner* — Mohamed Ibrahim

(74) *Attorney, Agent, or Firm* — Sughrue Mion, PLLC

(57) ABSTRACT

A load balancing device which can appropriately control the number of servers in operation according to load is provided. The load balancing device which performs wide area load distribution includes a load prediction/control unit that predicts a load fluctuation of a server on the basis of a change in load information indicating a state of a load on the server and shortens a valid time of the server when the load fluctuation indicates that the load on the server decreases.

6 Claims, 7 Drawing Sheets

(56) References Cited

U.S. PATENT DOCUMENTS

| | | | |
|---|---|---|---|
| 2013/0111467 A1* | 5/2013 | Sundararaj | G06F 9/505 |
| | | | 717/176 |
| 2014/0082172 A1 | 3/2014 | Chueh et al. | |
| 2015/0149635 A1* | 5/2015 | Rajagopalan | H04L 67/1014 |
| | | | 709/226 |
| 2015/0365305 A1* | 12/2015 | Namata | H04L 43/062 |
| | | | 705/14.54 |
| 2016/0088074 A1* | 3/2016 | Kannan | H04L 67/1002 |
| | | | 709/223 |
| 2016/0112500 A1 | 4/2016 | Kim et al. | |
| 2018/0097835 A1* | 4/2018 | McGrew | H04L 61/1511 |

FOREIGN PATENT DOCUMENTS

| | | |
|---|---|---|
| JP | H11-308267 A | 11/1999 |
| JP | 2002-318720 A | 10/2002 |
| JP | 2009-259206 A | 11/2009 |
| JP | 2012-090194 A | 5/2012 |
| WO | 2009/037915 A1 | 1/2011 |

OTHER PUBLICATIONS

Japanese Office Action for JP Application No. 2018-056063 dated Mar. 26, 2019 with English Translation.

\* cited by examiner

FIG. 2

| 501 | 502 | 503 | 504 | 505 | 506 | 507 | 508 |
|---|---|---|---|---|---|---|---|
| DOMAIN NAME | HOST NAME | IP ADDRESS | STANDBY PORT | CACHE VALID TIME | ALIVE/DEAD STATE | LOAD INFORMATION (NUMBER OF TCP CONNECTIONS) | MAXIMUM CONNECTION LIMIT VALUE |
| www | host1 | 10.1.1.1 | 80 | 86400 | Active | 1900 | 2000 |
| www | host2 | 10.2.1.1 | 80 | 3600 | Active | 800 | 2000 |
| www | host3 | 10.2.1.2 | 80 | | Standby | | 2000 |

TBL1

LOAD BALANCING DEVICE, COMMUNICATION SYSTEM, CONTROL METHOD, AND PROGRAM

TECHNICAL FIELD

The present invention relates to a load balancing device, a communication system, a control method, and a program.

BACKGROUND ART

A global server load balancing (GSLB) device is known as a device that distributes the load on a server among a plurality of sites. For example, at a normal time, the GSLB device transfers traffic to a server of a Tokyo data center (DC). Then, if the load temporarily increases, the GSLB device distributes the traffic to other DCs, public clouds, or the like. This enables a wide area load distribution.

Japanese Unexamined Patent Application, First Publication No. 2012-090194 and Japanese Unexamined Patent Application, First Publication No. 2009-259206 disclose technologies regarding GSLB devices as related technologies.

SUMMARY

Incidentally, in the technology described in Patent Document 1, the DNS server performs server alive/dead monitoring and load information collection, and when an existing server is in a high-load state or in a service disabled state, the DNS server issues a server activation command to a spare server which is in a standby state and assigns an access from a newly connected client terminal to the spare server. This is a technology for continuing service even if traffic rapidly increases.

However, the following problems arise if the spare server continues to operate even after the rapidly increased traffic returns to a normal state, that is, even after the load is reduced. That is, when the server is an on-premises server, the cost increases as the power consumption increases, and when the server operates on a public cloud, the cost increases in the metered billing as the amount of traffic increases.

It is an object of aspects of the present invention to provide a load balancing device, a communication system, a control method and a program which can solve the above problems.

According to an aspect of the present invention to achieve the above object, a load balancing device configured to perform wide area load distribution includes a load prediction/control unit configured to predict a load fluctuation of a server on the basis of a change in load information indicating a state of a load on the server and to shorten a valid time of operation of the server when the load fluctuation indicates that the load on the server decreases.

According to another aspect of the present invention, a communication system includes a load balancing device configured to predict a load fluctuation of a server on the basis of a change in load information indicating a state of a load on the server and to shorten a valid time of operation of the server when the load fluctuation indicates that the load on the server decreases and the server configured to be controlled according to the valid time of the operation determined by the load balancing device.

According to another aspect of the present invention, a control method performed by a load balancing device configured to perform wide area load distribution includes predicting a load fluctuation of a server on the basis of a change in load information indicating a state of a load on the server, and shortening a valid time of operation of the server when the load fluctuation indicates that the load on the server decreases.

According to another aspect of the present invention, a program causes a computer for a load balancing device configured to perform wide area load distribution to execute predicting a load fluctuation of a server on the basis of a change in load information indicating a state of a load on the server, and shortening a valid time of operation of the server when the load fluctuation indicates that the load on the server decreases.

According to the aspects of the present invention, it is possible to appropriately control the number of servers in operation according to the load.

BRIEF DESCRIPTION OF THE DRAWINGS

FIG. 2 is a diagram showing a server information table according to an embodiment of the present invention.

EXAMPLE EMBODIMENT

Embodiments

Hereinafter, embodiments will be described in detail with reference to the drawings.

Figure 1:
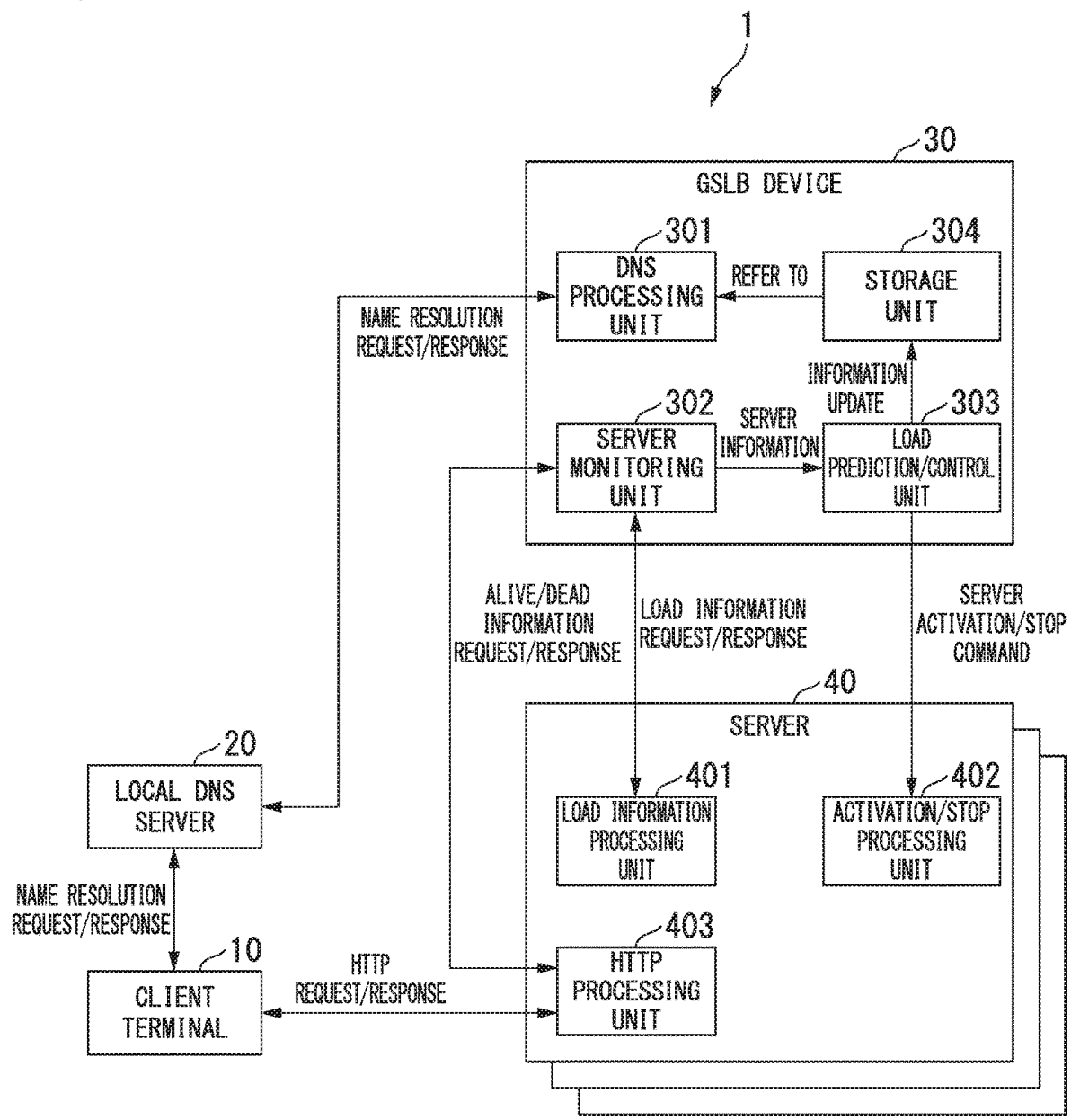
FIG. 1 is a diagram showing a configuration of a communication system according to an embodiment of the present invention.

A communication system 1 according to an embodiment of the present invention is a system that sets an optimum valid time of a DNS cache on the basis of prediction of the load on a server when distributing the load among different domains. As shown in FIG. 1, the communication system 1 includes a client terminal(s) 10, a local DNS server 20, a global server load balancing device (hereinafter referred to as a "GSLB device") 30 (an example of the load balancing device), and one or more servers 40. One or more servers 40 compose a server group 60.

The client terminal 10 and the local DNS server 20 are connected to a network(s) of a first domain as the same domain. The GSLB device 30 and the server(s) 40 are connected to a network(s) of a domain(s) different from the first domain. It is to be noted that the GSLB device 30 and the server 40 may be connected to a network of the same domain (for example, a second domain) or may be connected to networks of different domains (for example, the GSLB device 30 may be connected to a network of the second domain and the server 40 may be connected to a network of a third domain).

The client terminal 10 connects to a server 40 using the hypertext transfer protocol (HTTP) and issues a service request to the server 40.

Upon receiving a name resolution request from the client terminal 10, the local DNS server 20 issues a name resolution request to the GSLB device 30 and outputs (replies with) the IP address of the server 40 to the client terminal 10.

The GSLB device 30 is a device that performs wide area load distribution. The GSLB device 30 monitors the state of the server 40 and provides a name resolution service. The GSLB device 30 includes a DNS processing unit 301, a server monitoring unit 302, a load prediction/control unit 303, and a storage unit 304. The storage unit 304 stores a server information table TBL1. The s server information table TBL1 will be described later with reference to FIG. 2.

In response to the name resolution request from the local DNS server 20, the DNS processing unit 301 refers to the server information table TBL1, selects one server 40 from the server group 60, and responds with (returns) the IP address of the server 40.

The server monitoring unit 302 periodically performs a process of monitoring the alive/dead state of the server(s) 40 and a process of collecting load information of the server 40.

The load prediction/control unit 303 predicts a future load fluctuation on the basis of the load information of the server 40 collected by the server monitoring unit 302. The load prediction/control unit 303 updates a record of the server information table TBL1 according to the predicted future load fluctuation. The load prediction/control unit 303 issues an activation or stop command to the server 40 according to the predicted future load fluctuation.

As described above, the storage unit 304 stores the server information table TBL1. As shown in FIG. 2, the server information table TBL1 includes a domain name 501, a host name 502, an IP address 503, a standby port 504, a cache valid time 505 (an example of the valid time of operation), an alive/dead state 506, a load information 507, and a maximum connection limit value 508.

The domain name 501 is a domain name to be accessed by the client terminal 10.

The host name 502 is host name information for identifying the server 40 for the load prediction/control unit 303.

The IP address 503 is an IP address allocated to the server 40. The client terminal 10 accesses this IP address.

The standby port 504 is a port number on which a server process of the server 40 is awaiting access from the client terminal 10.

The cache valid time 505 is a period during which the local DNS server 20 and the client terminal 10 can locally store information on the IP address for the domain name obtained by the name resolution request. When the client terminal 10 accesses the domain name again within the cache valid time 505, it is possible to reuse the IP address of the server 40 without performing name resolution. Name resolution means to request an IP address on the basis of the domain name. When the cache valid time 505 has elapsed, the client terminal 10 discards the local record and performs name resolution again. The load prediction/control unit 303 can dynamically set the cache valid time 505 according to the load situation of each server 40.

It is to be noted that the cache valid time 505 is an example of the valid time of operation. The valid time of operation indicates, for example, a unit time during which the server 40 is enabled to provide a service. If the current time is within the cache valid time 505, the client terminal 10 can receive the provided service by reusing the IP address of the server 40 without performing name resolution.

The alive/dead state 506 is information indicating whether the server 40 is in an active state, a standby state, or a failed state.

Here, the active state is a state in which the power supply of the server 40 is on and the server 40 can provide a service. The standby state is a state in which the power supply of the server 40 is not on. The failed state is a state in which the server 40 cannot provide a service due to a failure of a computer, a malfunction of a program, or the like.

The load information 507 is a value representing the load on the server 40. For example, the number of transmission control protocol (TCP) connections that the client terminal 10 has established with the server 40 is used as the value of the load information 507. Load information such as CPU usage rate may also be used as the value of the load information 507.

The maximum connection limit value 508 is a value representing the allowable performance of the server 40. For example, the number of TCP connections that the client terminal 10 is allowed to establish with the server 40 is used as the value of the maximum connection limit value 508.

The server 40 provides an HTTP service of a web site or the like to the client terminal 10. The server group 60 is composed of one or more servers 40. The servers 40 include a server in an active state which is providing a service and a spare server in a standby state. The servers 40 may be connected to networks of different domains (of, for example, a Tokyo data center and an Osaka data center).

Each server 40 includes a load information processing unit 401, an activation/stop processing unit 402, and an HTTP processing unit 403.

The load information processing unit 401 collects the load information of the server(s) 40. The load information processing unit 401 responds to a load information request from the server monitoring unit 302. The load information processing unit 401 transmits load information such as the CPU usage rate and the number of TCP connections.

Upon receiving a server activation/stop command from the load prediction/control unit 303, the activation/stop processing unit 402 performs activation/stop processing of the server 40. Specifically, upon receiving a server activation command instructing that the server be activated from the load prediction/control unit 303, the activation/stop processing unit 402 performs activation processing of the server 40. On the other hand, upon receiving a stop command instructing that the server be stopped from the load prediction/control unit 303, the activation/stop processing unit 402 performs stop processing of the server 40.

Upon receiving a request from the client terminal 10, the HTTP processing unit 403 delivers the requested data (an HTML file, an image file, or the like) to the client terminal 10.

Figure 3:
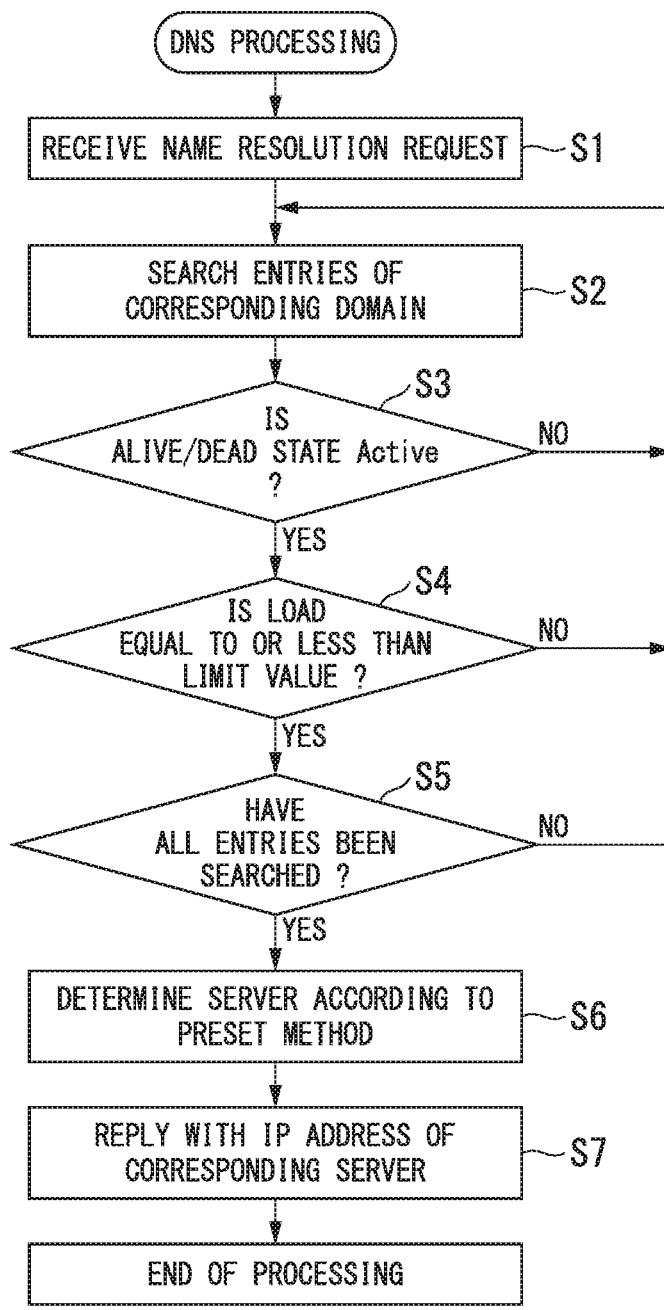
FIG. 3 is a first diagram showing a processing flow of the communication system according to an embodiment of the present invention.
Figure 4:
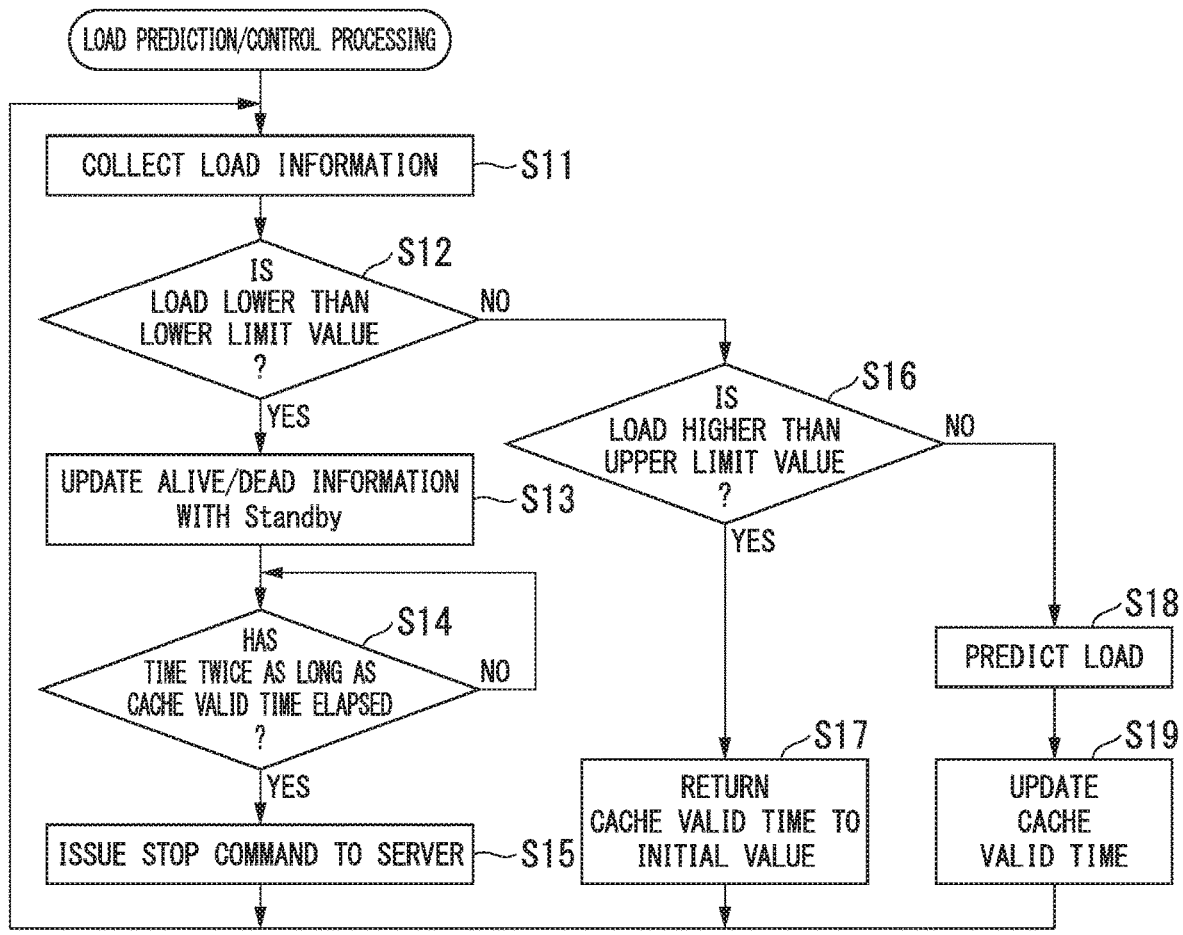
FIG. 4 is a second diagram showing a processing flow of the communication system according to an embodiment of the present invention.
Figure 5:
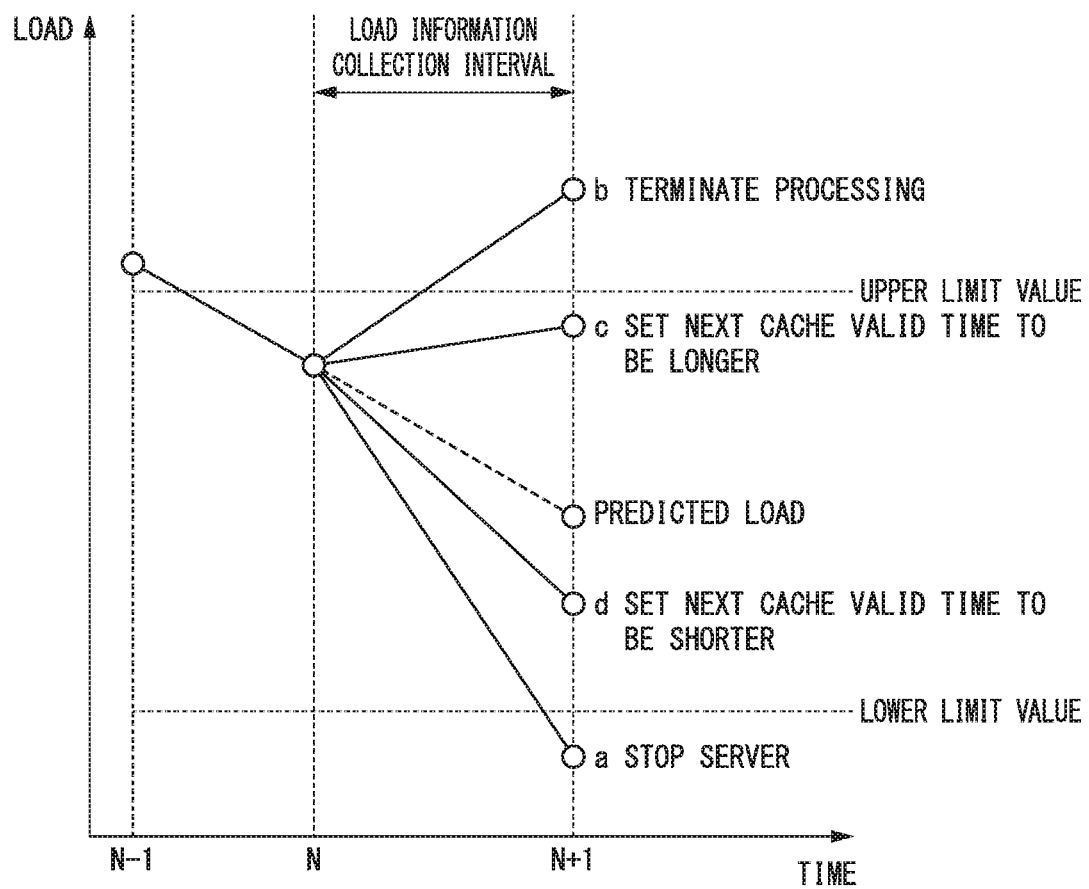
FIG. 5 is a diagram showing processing of the communication system according to an embodiment of the present invention.

Next, processing of the communication system 1 according to an embodiment of the present invention will be described with reference to FIGS. 3 to 5. Here, in particular, DNS processing and load prediction/control processing performed by the GSLB device 30 will be described in detail.

When the client terminal 10 accesses a predetermined domain name through the HTTP protocol, the client terminal 10 first transmits a name resolution request for the predetermined domain name to the local DNS server 20 using the DNS protocol.

The local DNS server 20 receives the name resolution request from the client terminal 10. Upon receiving the name resolution request, the local DNS server 20 issues a name resolution request to the GSLB device 30.

The DNS processing unit 301 receives the name resolution request from the local DNS server 20 (step S1).

Upon receiving the name resolution request, the DNS processing unit 301 searches the server information table TBL1 with target domain name of the name resolution request as a search key (step S2). The DNS processing unit 301 stores host names of entries that have been searched. The DNS processing unit 301 identifies a piece of entry information whose domain name 501 matches the target domain name of the name resolution request in the search results. The DNS processing unit 301 acquires the identified piece of entry information.

The DNS processing unit 301 determines whether or not the alive/dead state 506 in the acquired server information is "Active" (step S3).

Upon determining that the alive/dead state 506 is not "Active" (NO in step S3), the DNS processing unit 301 returns to the process of step S2 (searches the next entry).

Upon determining that the alive/dead state 506 is "Active" (YES in step S3), the DNS processing unit 301 determines whether or not the value of the load information 507 in the entry for which the alive/dead state 506 has been determined to be active is equal to or less than the maximum connection limit value 508 (step S4). For example, the DNS processing unit 301 determines whether or not the number of TCP connections that the client terminal 10 has established with the server 40 is equal to or less than the number of TCP connections allowed.

Upon determining that the value of the load information 507 is greater than the maximum connection limit value 508 (NO in step S4), the DNS processing unit 301 returns to the process of step S2 (searches the next entry).

Upon determining that the value of the load information 507 is equal to or less than the maximum connection limit value 508 (YES in step S4), the DNS processing unit 301 determines whether or not all entries have been searched (step S5). For example, the DNS processing unit 301 compares the number of searched host names, which are stored when searched in the server information table TBL1, with the total number of entries. Then, when the two numbers match, the DNS processing unit 301 determines that all entries have been searched. On the other hand, when the two numbers do not match, the DNS processing unit 301 determines that there is an entry that has not been searched.

Upon determining that there is an entry that has not been searched (NO in step S5), the DNS processing unit 301 returns to the process of step S2 (searches the next entry). The DNS processing unit 301 identifies another piece of entry information whose domain name 501 matches the domain name corresponding to the name resolution request.

Upon determining that all entries have been searched (YES in step S5), the DNS processing unit 301 selects an entry to be replied with from the entries obtained as a result of the search according to a preset load balancing method (such as round robin) (step S6). When a plurality of entries are given, the DNS processing unit 301 selects an entry according to a method such as round robin.

The DNS processing unit 301 outputs (replies with) the IP address 503 and the cache valid time 505 of the determined entry to the local DNS server 20 (step S7).

The local DNS server 20 receives the IP address 503 and the cache valid time 505 of the entry from the DNS processing unit 301. The local DNS server 20 outputs (replies with) the received IP address 503 to the client terminal 10.

The client terminal 10 receives the IP address 503 from the local DNS server 20. The client terminal transmits an HTTP request to the received IP address 503.

The local DNS server 20 and the client terminal 10 locally store the query result as a cache during a period set by the cache valid time 505.

When accessing the same domain name again, the client terminal 10 determines whether or not the current time is within the cache valid time 505. Upon determining that the current time is not within the cache valid time 505, the client terminal 10 again issues a name resolution request for the domain name to the local DNS server 20. On the other hand, upon determining that the current time is within the cache valid time 505, the client terminal 10 accesses the IP address of the server 40 corresponding to the domain name using the previous query result, without issuing a name resolution request for the domain name.

Also, when another client terminal 10 connected to the same domain as the local DNS server 20 has made a request for access to the domain name, the local DNS server 20 determines whether or not the current time is within the cache valid time 505. Upon determining that the current time is not within the cache valid time 505, the local DNS server 20 again issues a name resolution request for the domain name to the GSLB device 30. On the other hand, upon determining that the current time is within the cache valid time 505, the local DNS server 20 outputs (replies with) the previous query result to the client terminal 10 without issuing a name resolution request for the domain name to the GSLB device 30.

Now, with reference to FIGS. 4 and 5, a description will be given regarding the activation/stopping of the server 40 and the setting of the cache valid time 505 that the load prediction/control unit 303 performs upon predicting a decrease in the load.

The order of priority of servers 40 that are to be stopped when the load has decreased is predetermined according to, for example, the configurations of the servers 40.

The load prediction/control unit 303 periodically collects the load information 507 of the server 40 from the server monitoring unit 302 (step S11). The load prediction/control unit 303 determines whether or not the actual load is lower than a preset lower limit value of the load (step S12). For example, the load prediction/control unit 303 determines whether or not the number of TCP connections that the client terminal 10 has established with the server 40 is smaller than the lower limit value.

Upon determining that the actual load is lower than the preset lower limit value of the load (YES in step S12 and portion a in FIG. 5), the load prediction/control unit 303 writes Standby as the alive/dead state 506 of the corresponding entry in the server information table TBL1 (step S13).

To cause the cache valid time 505 of the client terminal 10 to expire, first, the load prediction/control unit 303 determines whether or not a time twice as long as the cache valid time 505 of the server 40 that is to be stopped has elapsed (step S14).

Upon determining that the time twice as long as the cache valid time 505 has not elapsed (NO in step S14), the load prediction/control unit 303 performs the process of step S14 again after a predetermined time (for example, at the timing when the next clock signal is input). That is, the load prediction/control unit 303 waits until the time twice as long as the cache valid time 505 has elapsed.

Upon determining that the time twice as long as the time of the cache valid time 505 has elapsed (YES in step S14), the load prediction/control unit 303 issues a stop command to the activation/stop processing unit 402 of the server 40 that is to be stopped. Upon receiving the stop command from the load prediction/control unit 303, the activation/stop processing unit 402 of the server 40 issues a stop command to a power supply of the server 40 to cause the server to stop (step S15). Then, the load prediction/control unit 303 returns to the process of step S11 after a lapse of a predetermined time. Thus, when the actual load is lower than the lower limit value, the server 40 is stopped after the time twice as long as the cache valid time 505 expires.

On the other hand, upon determining that the actual load is not lower than the preset lower limit value of the load (NO in step S12), the load prediction/control unit 303 determines whether or not the actual load is higher than a preset upper limit value of the load (step S16). For example, the load prediction/control unit 303 determines whether or not the number of TCP connections that the client terminal 10 has established with the server 40 is greater than the upper limit value.

Upon determining that the actual load is higher than the preset upper limit value of the load (YES in step S16 and portion b in FIG. 5), the load prediction/control unit 303 returns the cache valid time 505 to the initial value (step S17). Then, the load prediction/control unit 303 returns to the process of step S11 after a lapse of the predetermined time. When the actual load is higher than the upper limit value, there is a high possibility that the cache valid time 505 is updated with a longer time as the load increases. In this case, the load prediction/control unit 303 returns the cache valid time 505 to the initial value. This shortens the cache valid time 505. Then, as a result of the name resolution request after the cache valid time 505 expires, for example, another server 40 is selected, thereby suppressing the load on the server 40 whose load is higher than the upper limit value.

On the other hand, upon determining that the actual load is not higher than the preset upper limit value of the load (NO in step S16), the load prediction/control unit 303 predicts a load fluctuation on the basis of the load information 507 (step S18).

In response to the predicted load fluctuation, the load prediction/control unit 303 rewrites (updates) the cache valid time 505 of the server 40 that is to be stopped in the server information table TBL1 (step S19). At this time, if the current load is higher than the previous prediction, the load prediction/control unit 303 rewrites the stored cache valid time 505 with a longer cache valid time than the stored cache valid time 505 (portion c in FIG. 5). Further, if the current load is lower than the previous prediction, the load prediction/control unit 303 rewrites the stored cache valid time 505 with a shorter cache valid time than the stored cache valid time 505 (d portion in FIG. 5). Then, the load prediction/control unit 303 returns to the process of step S11 after a lapse of the predetermined time.

When the load tends to increase, the frequency of access to the server 40 will increase. Therefore, the cache valid time 505 is updated to be longer. On the other hand, if the load tends to decrease, the cache valid time 505 is updated to be gradually shortened in preparation for the decrease in the load below the lower limit value.

Figure 6:
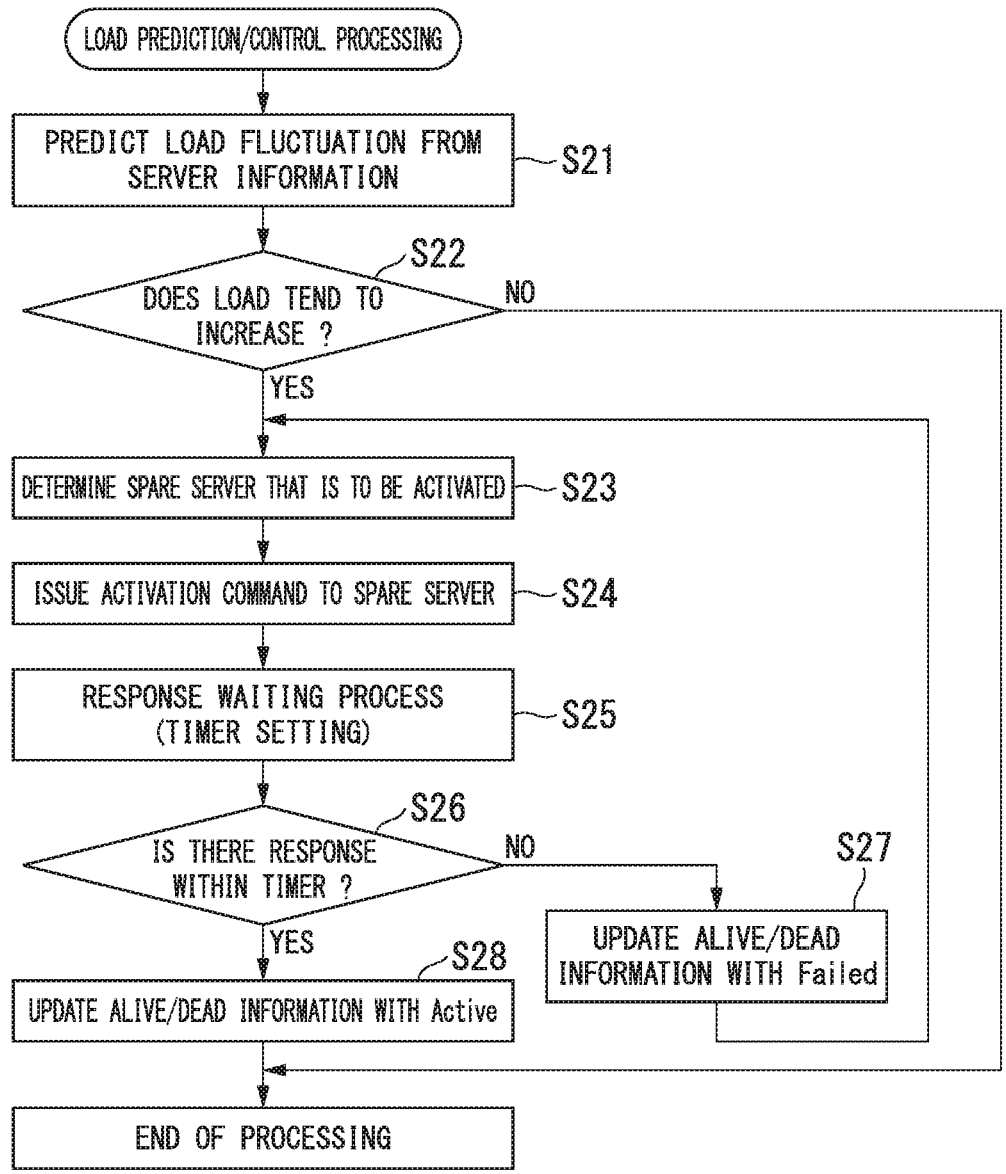
FIG. 6 is a third diagram showing a processing flow of the communication system according to an embodiment of the present invention.

Now, with reference to FIG. 6, a description will be given regarding the activation/stopping of the server 40 and the setting of the cache valid time 505 that the load prediction/control unit 303 performs upon predicting an increase in the load.

The load prediction/control unit 303 periodically collects the load information 507 of one or more servers 40 from the server monitoring unit 302. The load prediction/control unit 303 predicts a load fluctuation on the basis of the collected load information 507 (step S21).

Upon predicting an increase in the load on one or more servers 40 (step S22), the load prediction/control unit 303 searches the server information table TBL1 for a spare server 40 in a standby state to determine the spare server 40 that is to be activated (step S23). The order of priority of servers 40 that are to be activated when the load has increased is predetermined according to the configurations of the servers 40 or the like.

The load prediction/control unit 303 issues a server activation command to the activation/stop processing unit 402 of the server 40. Upon receiving the activation command from the load prediction/control unit 303, the activation/stop processing unit 402 of the server 40 issues an activation command to a power supply of the server 40 to cause the server to be active (step S24).

The server monitoring unit 302 sets a time of a timer and requests that the HTTP processing unit 403 of the spare server 40 confirm the alive/dead state of the HTTP service. In confirming the alive/dead state of the HTTP service, for example, the server monitoring unit 302 transmits a command to the HTTP processing unit 403 through the HTTP protocol and confirms a predetermined HTTP service response being returned from the HTTP processing unit 403 (step S25). The server monitoring unit 302 determines whether or not there is a response to the alive/dead confirmation request from the spare server 40 within the time of the timer (step S26).

Upon determining that there is no response within the time of the timer (NO in step S26), the server monitoring unit 302 writes Failed as the alive/dead state 506 of the server 40 (step S27). The server monitoring unit 302 returns to the process of step S23. That is, the load prediction/control unit 303 searches the server information table TBL1 for a spare server 40 in a standby state to determine the spare server 40.

If the power supply of the spare server 40 is activated and the response of the HTTP service is confirmed within the time of the timer (YES in step S26), the server monitoring unit 302 performs the following processing. That is, the server monitoring unit 302 writes Active as the alive/dead state 506 of the corresponding entry in the server information table TBL1 (updates the alive/dead state 506 thereof with Active) (step S28). In this way, when the load tends to increase, the spare server is activated and the server information table TBL1 is updated.

On the basis of the updated server information table TBL1, the DNS processing unit 301 replies to the name resolution request from the local DNS server 20 with the IP address of the server 40 according to a preset load distribution method (such as round robin). That is, in response to a name resolution request from the local DNS server 20, the DNS processing unit 301 performs searching in the same manner as in the step S2 on the basis of the updated server information table TBL1 and performs the same processes as those of steps S3 to S6. Then, the DNS processing unit 301 outputs (replies with) the IP address 503 of the determined entry to the local DNS server 20.

It is to be noted that, if the load on the server 40 decreases, the cache valid time 505 expires in a short time in the DNS cache stored in the client terminal 10 and the local DNS server 20. As described with reference to FIGS. 4 and 5, when the load tends to decrease, the next cache valid time 505 is updated to be shortened. On the other hand, if the actual load is lower than the lower limit value, the server 40 is stopped after the cache valid time 505 expires. Therefore, in the communication system 1 according to the embodiment of the present invention, it is possible to quickly stop unnecessary servers 40. When the client terminal 10 makes an HTTP access after the valid time expires, the local DNS server 20 again requests name resolution to the GSLB device 30. The GSLB device 30 replies with the IP address 503 of the active server 40 on the basis of the updated server information table TBL1. Therefore, the client terminal 10 does not access the server 40 that has been stopped. That is, the GSLB device 30 replies to the name resolution request with the IP address 503 of a server 40 different from the stopped server 40 on the basis of the updated server information table TBL1.

The communication system 1 according to an embodiment of the present invention has been described above. In the communication system 1 according to the embodiment of the present invention, the GSLB device 30 that performs wide area load distribution predicts a load fluctuation on the basis of a change in load information of the server 40 and decreases the cache valid time when the load fluctuation indicates that the load on the server 40 will decrease.

In this way, the GSLB device 30 according to the embodiment of the present invention can optimally set the cache valid time of a server that is scheduled to be stopped according to the load and can also appropriately control the operation of servers. That is, the GSLB device 30 can appropriately control the number of servers 40 in operation according to the load. As a result, it is possible to streamline operation costs (the electricity fee when the servers are physical servers and the metered bill according to the operation time when they are virtual machines on the public cloud).

Figure 7:
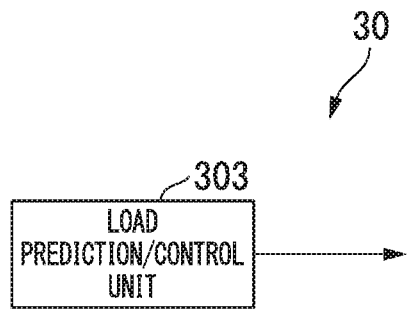
FIG. 7 is a diagram showing a minimum configuration of a global server load balancing device according to an embodiment of the present invention.

FIG. 7 is a diagram showing a minimum configuration of the GSLB device 30 according to an embodiment of the present invention.

The GSLB device 30 is a device that performs wide area load distribution. As shown in FIG. 7, the GSLB device 30 includes a load prediction/control unit 303.

The load prediction/control unit 303 predicts the load fluctuation on the basis of a change in the load information of the server. The load prediction/control unit 303 shortens the cache valid time when the predicted load fluctuation indicates that the load on the server will decrease.

It is to be noted that, in the processing according to the embodiment of the present invention, the order of processes may be changed within a scope in which appropriate processing is performed.

Each of the storage unit 304 in the embodiment of the present invention and other storage devices may be provided anywhere within a scope in which appropriate information transmission/reception is performed. Each of the storage unit 304 and other storage devices may be a plurality of storage devices and data may be distributed and stored within a scope in which appropriate information transmission/reception is performed.

Although embodiments of the present invention have been described, each of the communication system 1 and the GSLB device 30 described above and other control devices may have a computer system therein. The procedures of the above processes are stored in a computer-readable recording medium in the form of a program, and the above processes are performed by a computer reading and executing the program. A specific example of the computer is shown below.

Figure 8:
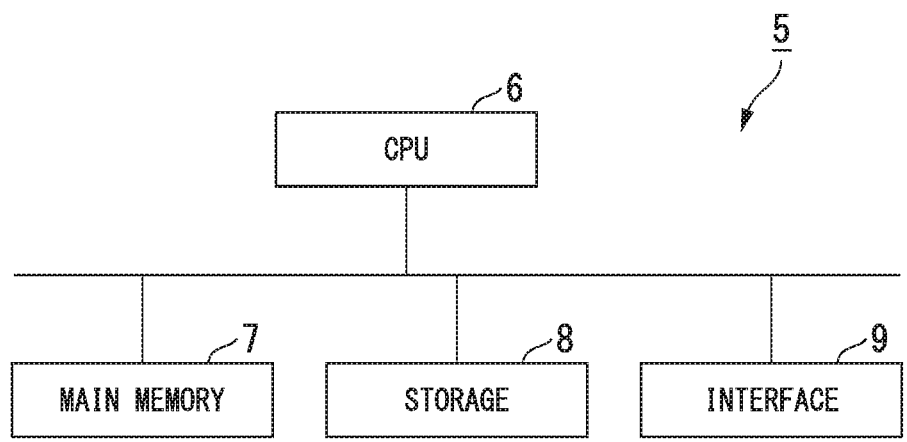
FIG. 8 is a schematic block diagram showing a configuration of a computer according to at least one embodiment.

FIG. 8 is a schematic block diagram showing a configuration of the computer according to at least one embodiment.

As shown in FIG. 8, the computer 5 includes a CPU 6, a main memory 7, a storage 8, and an interface 9.

For example, each of the communication system 1 and the GSLB device 30 described above and other control devices is mounted in the computer 5. The operation of each processing unit described above is stored in the storage 8 in the form of a program. The CPU 6 reads the program from the storage 8, loads the program in the main memory 7, and executes the above processes in accordance with the program. The CPU 6 reserves storage areas corresponding to the storage units in the main memory 7 in accordance with the program.

Examples of the storage 8 include a hard disk drive (HDD), a solid state drive (SSD), a magnetic disk, a magneto-optical disc, a compact disc read only memory (CD-ROM), a digital versatile disc read only memory (DVD-ROM), and a semiconductor memory. The storage 8 may be an internal medium that is directly connected to a bus of the computer 5 or may be an external medium that is connected to the computer 5 via the interface 9 or a communication line. Further, when the program is delivered to the computer 5 through a communication line, the computer 5 which has received the program may load the program in the main memory 7 and execute the above processes. In at least one embodiment, the storage 8 is a non-transitory physical storage medium.

Furthermore, the program may be one for realizing some of the above-described functions. The program may also be a so-called differential file (differential program) which can realize the above-described functions in combination with a program already recorded in the computer system.

Although embodiments of the present invention have been described, these embodiments are examples and do not limit the scope of the invention. Various additions, omissions, substitutions, and changes may be made to these embodiments without departing from the gist of the invention.

INCORPORATION BY REFERENCE

This application is based upon and claims the benefit of priority from Japanese patent application No. 2018-056063, filed Mar. 23, 2018, the disclosure of which is incorporated herein in its entirety by reference.

What is claimed is:

1. A load balancing device configured to perform wide area load distribution, the load balancing device comprising:
   a memory that stores a program and a valid time of operation of the server; and
   a processor that executes the program;
   wherein the processor is configured to:
      predict a load fluctuation of a server on the basis of a change in load information indicating a state of a load on the server, and rewrite the stored valid time of operation of the server to a shorter time each time the load on the server decreases when the load fluctuation indicates that the load on the server decreases, and
   wherein a provision of a service by the server is enabled for a period of time from a time the provision of the service is enabled until the valid time of the operation of the server, which is rewritten depending on the load fluctuation, has elapsed.

2. The load balancing device according to claim 1, wherein the processor is configured to lengthen the valid time when the load fluctuation indicates that the load on the server increases.

3. The load balancing device according to claim 1, wherein the processor is configured to rewrite the valid time stored in the memory with a longer time when the load fluctuation indicates that the load on the server increases.

4. The load balancing device according to claim 1, wherein the processor is configured to collect the load information, and
wherein the processor is configured to predict the load fluctuation on the basis of the collected load information.

5. A communication system comprising:
a load balancing device configured to predict a load fluctuation of a server on the basis of a change in load information indicating a state of a load on the server, and rewrite a valid time of operation of the server to a shorter time each time the load on the server decreases when the load fluctuation indicates that the load on the server decreases; and
the server configured to be controlled according to the valid time of the operation determined by the load balancing device,
wherein a provision of a service by the server is enabled for a period of time from a time the provision of the service is enabled until the valid time of the operation of the server, which is rewritten depending on the load fluctuation, has elapsed.

6. A control method performed by a load balancing device configured to perform wide area load distribution, the control method comprising:
predicting a load fluctuation of a server on the basis of a change in load information indicating a state of a load on the server; and
rewriting a valid time of operation of the server to a shorter time each time the load on the server decreases when the load fluctuation indicates that the load on the server decreases,
wherein a provision of a service by the server is enabled for a period of time from a time the provision of the service is enabled until the valid time of the operation of the server, which is rewritten depending on the load fluctuation, has elapsed.

* * * * *